United States Patent [19]

Janko

[11] 4,213,149
[45] Jul. 15, 1980

[54] APPARATUS FOR PREVENTING VIDEO TAPE DUPLICATION

[76] Inventor: Mike A. Janko, 5821 Cheyenne Ct., Oklahoma City, Okla. 73132

[21] Appl. No.: 972,906

[22] Filed: Dec. 26, 1978

[51] Int. Cl.² ............................................. H04N 5/78
[52] U.S. Cl. ................................. 358/153; 360/60; 358/148
[58] Field of Search .............. 358/4, 8, 127, 148, 358/185, 120, 153, 154; 360/27, 37, 60

[56] References Cited

U.S. PATENT DOCUMENTS

| | | | |
|---|---|---|---|
| 3,460,161 | 8/1969 | Waller | 358/120 |
| 3,530,232 | 9/1970 | Reiter | 358/120 |
| 3,963,865 | 6/1976 | Songer | 360/37 |
| 4,030,128 | 6/1977 | Perret | 358/114 |
| 4,086,634 | 4/1978 | Cook | 360/60 |
| 4,100,575 | 7/1978 | Morio | 360/37 |
| 4,121,242 | 10/1978 | Janko | 358/8 |

Primary Examiner—John C. Martin
Assistant Examiner—Michael A. Masinick
Attorney, Agent, or Firm—Dunlap, Codding & McCarthy

[57] ABSTRACT

A video processor is disclosed wherein each vertical sync pulse of a composite video signal is shifted to an intermediate amplitude a predetermined time period after the leading edge thereof, to defeat the synchronizing circuits of video tape recorders operating in the recording mode.

6 Claims, 3 Drawing Figures

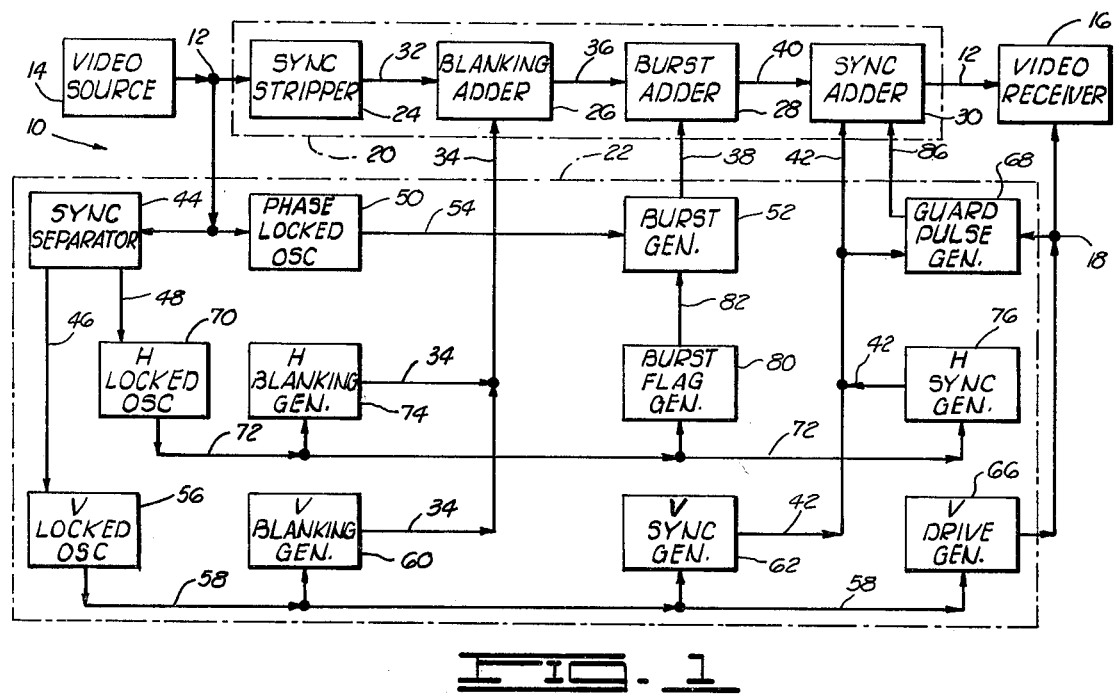
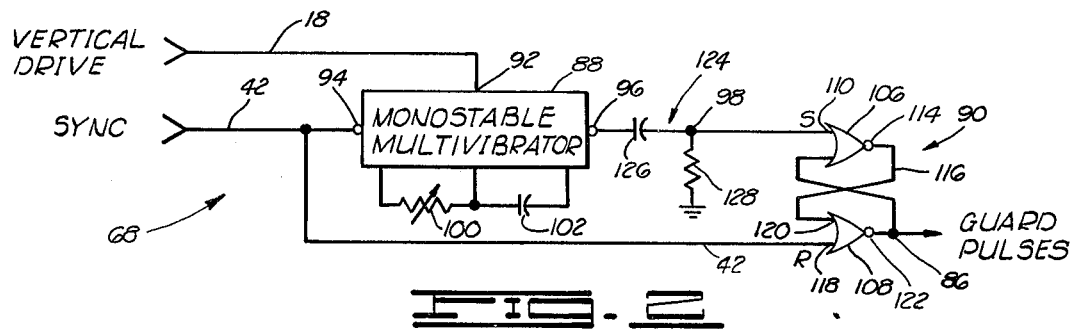
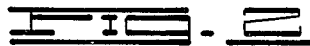
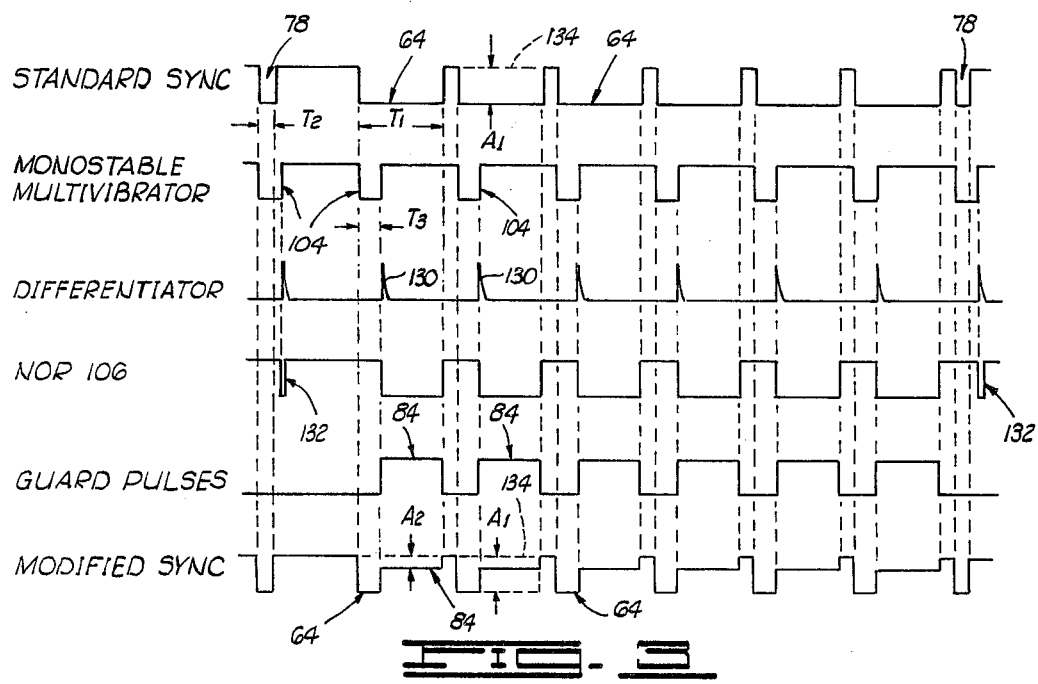

APPARATUS FOR PREVENTING VIDEO TAPE DUPLICATION

CROSS-REFERENCE TO RELATED APPLICATIONS

The subject matter of this paten application is related to the subject matter contained in U.S. Pat. No. 4,121,242, entitled "Video Processor Providing Sync Stripping and Re-Insertion", issued Oct. 17, 1978 to the same inventor.

BACKGROUND OF THE INVENTION

1. Field of the Invention

The present invention relates generally to video processors for processing video input signals to provide a video output signal for application to a video tape recorder or the like, and, more particularly, wherein the video output signal has modified vertical sync pulses to discourage or prevent duplication of the video output signal after the initial recording thereof.

2. Prior Art Statment

Since the advent of cable TV, various methods and devices have been proposed to modify the NTSC standard composite video signal so as to prevent satisfactory reception and display at a non-authorized receiver unit. Exemplary embodiments of such devices may be found in U.S. Pat. No. 3,460,161, issued to Waller et al., and U.S. Pat. No. 3,530,232, issued to Reiter et al. However, such techniques have proved inappropriate to prevent the duplication of video tape recordings which are now being marketed to supply the rapidly increasing numbers of "home" video tape recorders. Consequently, such methods as those taught in U.S. Pat. No. 3,963,865, issued to Songer, and U.S. Pat. No. 4,030,128, issued to Perret, have been proposed to solve this problem.

To facilitate examination, copies of each of the above patents are submitted herewith.

SUMMARY OF THE INVENTION

The present invention contemplates a video processor for processing a video input signal provided by a video source, the video input signal including vertical sync pulses of predetermined form and time duration, and for providing a video output signal having modified vertical sync pulses. More particularly, the video processor comprises a video processing circuit for adding to the video input signal prior to the output thereof, a plurality of guard pulses generated via a guard pulse generator to have predetermined form and time duration relative to the vertical sync pulses.

An object of the present invention is to provide a video processor for processing a video input signal to provide a video output signal having modified vertical sync pulses.

Another object of the present invention is to provide a video processor constructed to modify the vertical sync pulses of a composite video signal in a manner which prevents the recording thereof on conventional video tape recorders.

A further object of the invention is to provide a video processor having a guard pulse generator constructed to generate guard pulses of predetermined form and time duration relative to the vertical sync pulses of a composite video signal, wherein the addition of the guard pulses to the composite video signal produces a video output signal capable of being recorded only on specially synchronized video tape recorders yet fully capable of display on conventional television receivers.

Other objects and advantages of the invention will be evident from the following detailed description when read in conjunction with the accompanying drawings which illustrate the preferred embodiment of the present invention.

BRIEF DESCRIPTION OF THE DRAWINGS

FIG. 1 illustrates in schematic form a video processor constructed in accordance with the preferred embodiment of the present invention.

FIG. 2 illustrates in schematic form a guard pulse generator constructed in accordance with the preferred embodiment of the present invention.

FIG. 3 illustrates via waveform diagrams the operation of the preferred embodiment of the present invention.

DESCRIPTION OF THE PREFERRED EMBODIMENT

Referring to the drawings in general and to FIG. 1 in particular, shown therein and referred to by the general reference number 10 is a video processor constructed in accordance with the preferred embodiment of the present invention. The video processor 10 is designed to be interposed in a signal path 12 generally between a video source 14 and a video receiver 16. The video processor 10 is constructed to receive a composite video signal having standard vertical sync pulses, such as those shown in the first waveform of FIG. 3, and to provide a composite video signal having modified vertical sync pulses of the type shown in the sixth waveform of FIG. 3. The modifications made by the video processor 10 to the vertical sync pulses in no way interferes with the reception and display of the video signal by conventional television receivers. However, the modified vertical sync pulses differ from standard vertical sync pulses in a particular manner which prevents proper synchronization of commercially available video tape recorders, thereby preventing such recorders from accurately recording the video output signal. To facilitate an initial recording, the video processor 10 provides a vertical drive signal via a signal path 18 which may be used by a video receiver 16 constructed to receive it, such as a video tape recorder having an external synchronization capability.

In the preferred form, the video processor 10 is comprised generally of a video processing circuit 20 and a sync generator 22. Although not necessary for the operation of the present invention, the preferred form of the sync generator 22 and the video processing circuit 20 includes circuitry to generate and substitute high quality vertical sync, horizontal sync and color burst signals for those present in the video input signal.

In the form shown in FIG. 1, the video processing circuit 20 is comprised of a sync stripper 24, a blanking adder 26, a burst adder 28, and a sync adder 30. The sync stripper 24 receives the video input signal provided by the video source 14 via the signal path 12, and operates in a conventional manner to strip the vertical and horizontal sync signals, and color bursts if present, from the received video input signal. The blanking adder 26 receives the stripped video signal from the sync stripper 24 via a signal path 32, and operates in a conventional manner to add to the stripped video signal the vertical and horizontal blanking pulses applied thereto via a signal path 34. In a similar manner, the burst adder 28 receives the partially reconstructed video signal from the blanking adder 26 via a signal path 36, and operates in a conventional manner to add to the video signal any color bursts applied thereto via a signal path 38. Finally, the sync adder 30 receives the video signal provided by the burst adder 28 via a signal path 40, and operates in a conventional manner to add to the received video signal the horizontal and vertical sync pulses applied thereto via a signal path 42. Thus, the video output signal provided by the sync adder 30 via the signal path 12 will contain all of the video picture information as it was received from the video source 14 but will have high quality blanking, color burst, and sync pulses entrained therein.

In the sync generator 22, a sync separator 44 receives the video input signal provided by the video source 14 via the signal path 12, detects the vertical and horizontal sync pulses entrained therein, and provides respective vertical and horizontal detection signals via signal paths 46 and 48, respectively, in phase with the detected vertical and horizontal sync pulses. A phase locked oscillator 50 also receives the video input signal provided by the video source 14 via the signal path 12, and operates in a conventional manner to detect color bursts entrained in the video input signal and provide a color reference signal to a burst generator 52 via a signal path 54.

In a vertical synchronization portion of the sync generator 22, a vertical locked oscillator 56 receives the vertical detection signal provided by the sync separator 44 via the signal path 46, and operates in a conventional manner to provide a vertical synchronizing signal via a signal path 58 which is in phase with the vertical sync signals in the video input signal. A vertical blanking generator 60 receives the vertical synchronizing signal provided by the vertical locked oscillator 56 via the signal path 58, and operates in a conventional manner to provide vertical blanking pulses of standard form and time duration for application to the blanking adder 26 via the signal path 34. A vertical sync generator 62 also receives the vertical synchronizing signal provided by the vertical locked oscillator 56 via the signal path 58, and operates in a conventional manner to provide vertical sync pulses 64 (see the first waveform of FIG. 3) of standard time duration, $T_1$, for application to the sync adder 30 via the signal path 42. In addition, a vertical drive generator 66 receives the vertical synchronizing signal provided by the vertical locked oscillator 56 via the signal path 58, and operates in a conventional manner to provide a vertical drive signal of standard form and time duration relative to the vertical synchronizing portion of the video input signal, for application to a guard pulse generator 68 and the video receiver 16 via the signal path 18.

In a horizontal synchronizing portion of the sync generator 22, a horizontal locked oscillator 70 receives the horizontal detection signal provided by the sync separator 44 via the signal path 48, and operates in a conventional manner to provide a horizontal synchronization signal via a signal path 72 which is in phase with the horizontal sync signals in the video input signal. A horizontal blanking generator 74 receives the horizontal synchronizing signal provided by the horizontal locked oscillator 70 via the signal path 72, and operates in a conventional manner to provide horizontal blanking pulses of standard form and time duration relative to the received horizontal synchronizing signal for application to the blanking adder 26 via the signal path 34. A horizontal sync generator 76 also receives the horizontal synchronizing signal provided by the horizontal locked oscillator 70 via the signal path 72, and operates in a conventional manner to provide horizontal sync pulses 78 (see the first waveform of FIG. 3) of standard time duration, $T_2$, for application to the sync adder 30 via the signal path 42. In addition, a burst flag generator 80 receives the horizontal synchronizing signal provided by the horizontal locked oscillator 70 via the signal path 72, and operates in a conventional manner to provide a burst flag signal for application to the burst generator 52 via a signal path 82 a predetermined time period after each detected horizontal sync pulse. In response to the burst flag signal applied thereto via the signal path 82, the burst generator 52 generates a color burst for application to the burst adder 28 via the signal path 38 in phase with the color reference signal provided by the phase locked oscillator 50 via the signal path 54.

The guard pulse generator 68 receives the vertical drive signal provided by the vertical drive generator 66 via the signal path 18, and is placed in an enabled condition in response thereto. The guard pulse generator 68 is also connected to receive the horizontal and vertical sync pulses 78 and 64 (see the first waveform of FIG. 3) provided on the signal path 42 by the horizontal and vertical sync generators 76 and 62, respectively. In the enabled condition thereof, the guard pulse generator 68 will be responsive to each of the vertical sync pulses 64 received via the signal path 42. A predetermined time duration, $T_3$, after each of the received vertical sync pulses 64, the guard pulse generator 68 will provide a guard pulse 84 (see the fifth waveform of FIG. 3) for application to the sync adder 30 via a signal path 86.

In the preferred form shown in FIG. 2, the guard pulse generator 68 is comprised primarily of a monostable multivibrator 88 and a latch 90. The monostable multivibrator 88 has a reset terminal 92 connected to the signal path 18, an inverting input terminal 94 connected to the signal path 42, an output terminal 96 connected to the latch 90 via a signal path 98, and a time delay network comprised of a variable resistor 100 and a capacitor 102. As shown in the second waveform diagram of FIG. 3, the values of the resistor 100 and the capacitor 102 are preferably selected so that the monostable multivibrator 88 provides an output pulse 104 of predetermined time duration, $T_3$, in response to the leading edge of each of the horizontal and vertical sync pulses 78 and 64, respectively.

The latch 90 is comprised of a pair of NOR gates 106 and 108 connected in a conventional R/S flip flop configuration. More particularly, the NOR gate 106 has a set terminal 110 connected to the output terminal 96 of the monostable multivibrator 88 via the signal path 98, a latch terminal 112 connected to the signal path 86, and an output terminal 114 connected to a signal path 116. In a similar manner, the NOR gate 108 has a reset terminal 118 connected to the signal path 42, a latch terminal 120 connected to the signal path 116, and an output terminal 122 connected to the signal path 86. As can be seen in the fifth waveform diagram of FIG. 3, the latch 90 initiates a guard pulse 84 in response to the termination of each monostable multivibrator output pulse 104 received at the set terminal 110 of the NOR gate 106 when a vertical sync pulse 64 is also being received at the reset terminal 118 of the NOR gate 108. Thereafter, the latch 90 will terminate the guard pulse 84 upon the termination of the vertical sync pulse 64, regardless of whether a monostable multivibrator output pulse 104 is being received or not. By selecting the time duration $T_3$ of the output pulse 104 of the monostable multivibrator 88 to be greater than the time duration $T_2$ of the horizontal sync pulses 78 but less than the time duration $T_1$ of the vertical sync pulses 64, the guard pulse generator 68 can be made to provide the guard pulses 84 only during the vertical synchronizing interval.

To improve the response characteristics of the latch 90, a conventional differentiator 124, comprises of capacitor 126 and resistor 128, may be interposed in the signal path 98 between the output terminal 96 of the monstable multivibrator 88 and the set terminal 110 of the NOR gate 106. As shown in the third waveform of FIG. 3, the differentiator 124 provides output spikes 130 for application to the latch 90 upon the termination of each monstable multivibrator output pulse 104. In the preferred form, the values of the capacitor 126 and resistor 128 should be selected so that the output spikes 130 are sufficiently long to set the latch 90, without interfering with the resetting of the latch 90 by the vertical sync pulses 64. In this form, the NOR gate 106 may provide short duration output pulses, as at 132 in the fourth waveform of FIG. 3, after each horizontal sync pulse 78, without affecting the output of the NOR gate 108.

In the sync adder 30, the guard pulses 84 are added to, or superimposed on, the vertical sync pulses 64 entrained in the composite video signal. More particularly, assuming that the vertical sync pulses 64 would otherwise exhibit a standard amplitude, $A_1$, relative to a reference potential 134 (see the sixth waveform of FIG. 3), the sync adder 30 preferably includes conventional level shifting circuitry (not shown) to change the amplitude of the vertical sync pulses 64 so that the guard pulses 84 will be presented in the video output signal at an amplitude, $A_2$, which is less than the standard amplitude $A_1$. By way of example, one preferred embodiment operates with a $T_3$ time period of $7\pm2$ microseconds and an $A_2$ amplitude which is 33%±20% of the $A_1$ amplitude. However, these values may be varied to accommodate the type of equipment being used or defeated, as the case may be.

It has been determined that the preferred form of the present invention as disclosed herein is capable of providing a video output signal having vertical sync pulses which are sufficient to enable the synchronizing circuits of commercially available television receivers to detect and satisfactorily display the video signal. In contrast, the vertical sync pulses are in such form that the synchronizing circuits of commercially available video tape recorders are unable to synchronize therewith when operating in the recording mode, thus preventing satisfactory recording. On the other hand, the same video tape recorders are quite capable of satisfactorily playing back a video tape which has been recorded using the present invention. Thus, the present invention in no way limits display of the video signal, only duplication. To this end, various changes may be made in the construction and arrangement of the parts or elements of the preferred embodiment as disclosed herein without departing from the spirit and scope of the present invention as defined in the following claims.

What is claimed is:

1. A video processor for processing a video input signal provided by a video source, the video input signal including at least one vertical sync pulse of first predetermined amplitude relative to a reference potential and of first predetermined time duration, and for providing a video output signal having modified vertical sync pulses, the video processor comprising:

a video processing circuit connected to the video source, the video processing circuit receiving the video input signal and guard pulses, and adding the received guard pulses to the received video input signal at a second pre-determined amplitude which is less than the first predetermined amplitude relative to the reference potential for output as the video output signal having modified vertical sync pulses; and a sync generator connected to the video source and to the video processing circuit, the sync generator receiving the video input signal, detecting the vertical sync pulses of the received video input signal, and providing the guard pulses a second predetermined time duration after each detected vertical sync pulse, the second predetermined time duration being less than the first predetermined time duration.

2. The video processor of claim 1 wherein the sync generator comprises:

synchronizing means connected to the video source, the synchronizing means receiving the video input signal, detecting the vertical sync pulses in the received video input signal, and providing synchronizing pulses corresponding to the detected vertical sync pulses; and, a guard pulse generator comprising:

monostable multivibrator means connected to the synchronizing means, the monostable multivibrator means receiving the synchronizing pulses, initiating a monostable multivibrator output signal in response to each received synchronizing pulse, and terminating the monostable multivibrator output signal the second predetermined time period after receiving said synchronizing pulse; and, latch means connected to the synchronizing means and to the monostable multivibrator means, the latch means receiving the synchronizing pulses and the monostable multivibrator output signal, initiating the guard pulse in response to the termination of each monostable multivibrator output signal received during a received synchronizing pulse, and terminating the guard pulse upon the termination of said synchronizing pulse;

and wherein the video processing circuit includes:

adder means connected to the video source and to the latch means, the adder means receiving the video input signal and the guard pulses, and adding the received guard pulses to the received video input signal by changing the amplitude of the vertical sync pulses of the received video input signal to the second predetermined amplitude in response to each received guard pulse.

3. The video processor of claim 2 wherein the latch means comprises an R/S flip flop having a set terminal connected to receive the monostable multivibrator output signal and a reset terminal connected to receive the synchronizing pulses.

4. The video processor of claim 3 wherein the guard pulse generator further comprises:

a differentiator interposed between the monostable multivibrator and the set terminal of the R/S flip flop.

5. The video processor of claim 1 wherein the second predetermined time duration is $7\pm2$ microseconds.

6. The video processor of claim 1 wherein the second predetermined amplitude is 33%±20% of the first predetermined amplitude.

* * * * *